US009530071B2

(12) United States Patent
Yin et al.

(10) Patent No.: US 9,530,071 B2
(45) Date of Patent: Dec. 27, 2016

(54) HIERARCHICAL INTERLINKED MULTI-SCALE CONVOLUTIONAL NETWORK FOR IMAGE PARSING

(71) Applicant: Beijing Kuangshi Technology Co., Ltd., Beijing (CN)

(72) Inventors: Qi Yin, Beijing (CN); Zhimin Cao, Beijing (CN); Yisu Zhou, Beijing (CN)

(73) Assignee: Beijing Kuangshi Technology Co., Ltd., Beijing (CN)

( * ) Notice: Subject to any disclaimer, the term of this patent is extended or adjusted under 35 U.S.C. 154(b) by 117 days.

(21) Appl. No.: 14/402,030

(22) PCT Filed: Oct. 10, 2014

(86) PCT No.: PCT/CN2014/088285
§ 371 (c)(1),
(2) Date: Nov. 18, 2014

(87) PCT Pub. No.: WO2016/054802
PCT Pub. Date: Apr. 14, 2016

(65) Prior Publication Data
US 2016/0104053 A1    Apr. 14, 2016

(51) Int. Cl.
*G06K 9/46* (2006.01)
*G06K 9/00* (2006.01)
(Continued)

(52) U.S. Cl.
CPC .......... *G06K 9/46* (2013.01); *G06K 9/00228* (2013.01); *G06K 9/00248* (2013.01);
(Continued)

(58) Field of Classification Search
None
See application file for complete search history.

(56) References Cited

U.S. PATENT DOCUMENTS

| 6,690,724 B1 * | 2/2004 | Kadono | G06T 9/20 |
| | | | 375/240.01 |
| 2004/0125390 A1 * | 7/2004 | Miki | G06T 3/4038 |
| | | | 358/1.9 |

(Continued)

FOREIGN PATENT DOCUMENTS

| JP | EP 0993190 A2 * | 4/2000 | ........... H04N 5/772 |
| KR | 20120088350 A * | 8/2012 | |

OTHER PUBLICATIONS

Alvarez et al., "Semantic Road Segmentation via Multi-scale Ensembles of Learned Features", Computer Vision ECCV 2012, Ws/Demos, Part II, LNCS 7584, pp. 586-595, Berlin, Germany.
(Continued)

*Primary Examiner* — Stephen R Koziol
*Assistant Examiner* — Delomia L Gilliard
(74) *Attorney, Agent, or Firm* — Fenwick & West LLP

(57) ABSTRACT

A disclosed facial recognition system (and method) includes face parsing. In one approach, the face parsing is based on hierarchical interlinked multiscale convolutional neural network (HIM) to identify locations and/or footprints of components of a face image. The HIM generates multiple levels of image patches from different resolution images of the face image, where image patches for different levels have different resolutions. Moreover, the HIM integrates the image patches for different levels to generate interlinked image patches for different levels, where interlinked image patches for different levels have different resolutions. Furthermore, the HIM combines the interlinked image patches to identify refined locations and/or footprints of components.

21 Claims, 8 Drawing Sheets

(51) Int. Cl.
- *G06K 9/66* (2006.01)
- *G06T 3/00* (2006.01)
- *G06T 3/40* (2006.01)
- *G06T 7/00* (2006.01)
- *G06T 11/60* (2006.01)

(52) U.S. Cl.
CPC ............. *G06K 9/4628* (2013.01); *G06K 9/66* (2013.01); *G06T 3/00* (2013.01); *G06T 3/4046* (2013.01); *G06T 7/0081* (2013.01); *G06T 11/60* (2013.01); *G06K 2009/4666* (2013.01)

(56) References Cited

U.S. PATENT DOCUMENTS

| 2007/0274608 | A1* | 11/2007 | Le Leannec | G06T 3/40 382/299 |
| 2014/0147049 | A1* | 5/2014 | Sumitomo | G06T 7/0075 382/190 |
| 2014/0355892 | A1* | 12/2014 | Moon | G06K 9/6215 382/220 |

OTHER PUBLICATIONS

Bergstra et al., "Theano: A CPU and GPU Math Compiler in Python", Proc. of the 9th Python in Science Conf. (SCIPY 2010), 2010, pp. 1-7.

Bottou, "On-Line Learning and Stochastic Approximations", Online Learning in Neural Networks, 1998, pp. 9-42, Saad David (ed.).

Farabet et al., "Learning Hierarchical Features for Scene Labeling" IEEE Transactions on Pattern Analysis and Machine Intelligence, Aug. 2013, pp. 1915-1929, vol. 35(8).

Goodfellow et al., "Pylearn2: a machine learning research library", ADD PUB, 2013, pp. 1-9.

Le et al., "Interactive Facial Feature Localization" ECCV 2012, pp. 679-692, A. Fitzgibbon et al. (Eds.), Springer-Verlag Berlin Heidelberg.

Lecun et al., "Gradient-Based Learning Applied to Document Recognition", Proceedings of the IEEE, Nov. 1998, pp. 2278-2324, vol. 86(11).

Luo et al., "Hierarchical Face Parsing via Deep Learning", 2012 IEEE Conference on Computer Vision and Pattern Recognition (CVPR) 2012, pp. 2480-2487.

Luo et al., "Pedestrian Parsing via Deep Decompositional Network", ICCV, 2013, pp. 2648-2655.

Pinheiro et al "Recurrent Convolutional Neural Networks for Scene Labeling", Proceedings of the 31st International Conference on Machine Learning, 2014, pp. 1-9, Beijing, China.

Riesenhuber et al., "Hierarchical models of object recognition in cortex", Nature America Inc., 1999, pp. 1019-1025, vol. 2(11).

Seyedhosseini et al. "Image Segmentation with Cascaded Hierarchical Models and Logistic Disjunctive Normal Networks" ICCV, 2013, pp. 2168-2175.

Smith et al. "Exemplar-Based Face Parsing", 2013 IEEE Conference on Computer Vision and Pattern Recognition, 2013, pp. 3484-3491.

Socher et al., "Parsing Natural Scenes and Natural Language with Recursive Neural Networks", Proceedings of the 28th International Conference on Machine Learning, 2011, pp. 1-8.

Tu et al., "Image Parsing: Unifying Segmentation, Detection, and Recognition", International Journal of Computer Vision, 2005, pp. 113-140, vol. 63(2), The Netherlands.

Warrell et al. "Labelfaces: Parsing Facial Features by Multiclass Labeling with an Epitome Prior" IEEE, 2009, ICIP 2009, pp. 2481-2484.

Zhou et al., "Extensive Facial Landmark Localization with Coarse-to-fine Convolutional Network Cascade", ICCV, 2013, pp. 386-391.

\* cited by examiner

HIERARCHICAL INTERLINKED MULTI-SCALE CONVOLUTIONAL NETWORK FOR IMAGE PARSING

FIELD OF THE INVENTION

This invention relates generally to image processing and, more particularly, to parsing an image into components.

DESCRIPTION OF THE RELATED ART

Image parsing is the task of labeling an image to a list of components (or parts). Image parsing is a fundamental problem in computer vision. For image parsing, landmark extraction (or landmarking) or segmentation is commonly employed. Landmark extraction is used to locate components and segmentation is used to obtain footprints or shapes of the components. Image parsing of a face image is challenging, because landmark points obtained from the landmark extraction may not be well-defined and it may be difficult to encode uncertainty in landmarks (e.g., nose ridge). Additionally, image parsing is challenging because face parts are deformable.

The outcomes of landmark extraction and segmentation depend on scales of information. A local appearance in a lower (i.e., finer) scale provides a precise contour of a component, and a global characteristic in a higher (i.e., coarser) scale provides an appearance likelihood or whereabouts of the component. Hence, integration of multiscale information enables accurate parsing of images.

Thus there is a need for good approaches to performing image parsing by efficiently utilizing information present in different scales.

SUMMARY

The present invention overcomes the limitations of the prior art by employing a framework for performing image parsing. In one approach, the framework is based on a structure of hierarchical interlinked multiscale convolutional neural network (HIM) for locating and/or segmenting components of an image. The HIM enables integration of data at different scales(i.e., resolutions) in any direction for better use of data in each scale.

One aspect concerns a system for performing image parsing of an image. In one example, the system is used in face recognition by parsing a face image. The system includes HIM for locating and/or generating footprints of the components from the image. The HIM effectively integrates information in different scales (i.e., resolutions).

In one architecture a HIM includes a level generator, an interlinked combiner and an aggregator. The level generator receives an image and generates N levels of image patches from the image. Preferably, N>2, and the image patches for different levels n have different resolutions R(n). The image patches for a level n are generated from the image resampled to resolution R(n). In an example implementation, the level generator generates more image patches for levels n with lower resolutions R(n).

The interlinked combiner receives the N levels of image patches from the level generator and generates M levels of interlinked image patches from the N levels of image patches, where preferably 2<M≤N. The interlinked image patches for different levels in have different resolutions R(m) and the interlinked image patches for a level m are generated from an input group in of image patches. The input group m of image patches include (i) image patches from level n with R(n)=R(m), and (ii) image patches from one or more levels n with R(n)≠LR(m) where such image patches have been resampled to resolution R(m).

The aggregator locates the components by combining the M levels of interlinked image patches. In an example implementation, the aggregator receives the M levels of interlinked image patches and generates L levels of output image patches, where L<M. The output image patches for different levels l have different resolutions R(l), where each R(l) corresponds to one of the R(m). The output image patches for a level l are generated from an input group l of image patches comprising (i) interlinked image patches from level m with R(m)=R(l), and (ii) output image patches from one or more levels with resolution less than R(l), where such output image patches have been resampled to resolution R(l).

Another aspect concerns a second stage of hierarchical interlinked multiscale convolutional neural networks configured to receive the component locations produced by the HIM. Each hierarchical interlinked multiscale convolutional neural network in the second stage is configured to obtain a refined location and/or footprint of one of said components.

Other aspects include components, devices, systems, improvements, methods, processes, applications and other technologies related to the foregoing.

BRIEF DESCRIPTION OF THE DRAWINGS

The invention has other advantages and features which will be more readily apparent from the following detailed description of the invention and the appended claims, when taken in conjunction with the accompanying drawings, in which:

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

A disclosed facial recognition system (and method) includes face parsing. In one approach, the face parsing is based on hierarchical interlinked multiscale convolutional neural network (HIM) to identify locations and/or footprints of components of a face image. The HIM generates multiple levels of image patches from different resolution images of the face image, where image patches for different levels have different resolutions. Moreover, the HIM integrates the image patches for different levels to generate interlinked image patches from different levels having different resolutions. Furthermore, the HIM combines the interlinked image patches to identify locations and/or footprints of the components.

Face Recognition Overview

Figure 1:
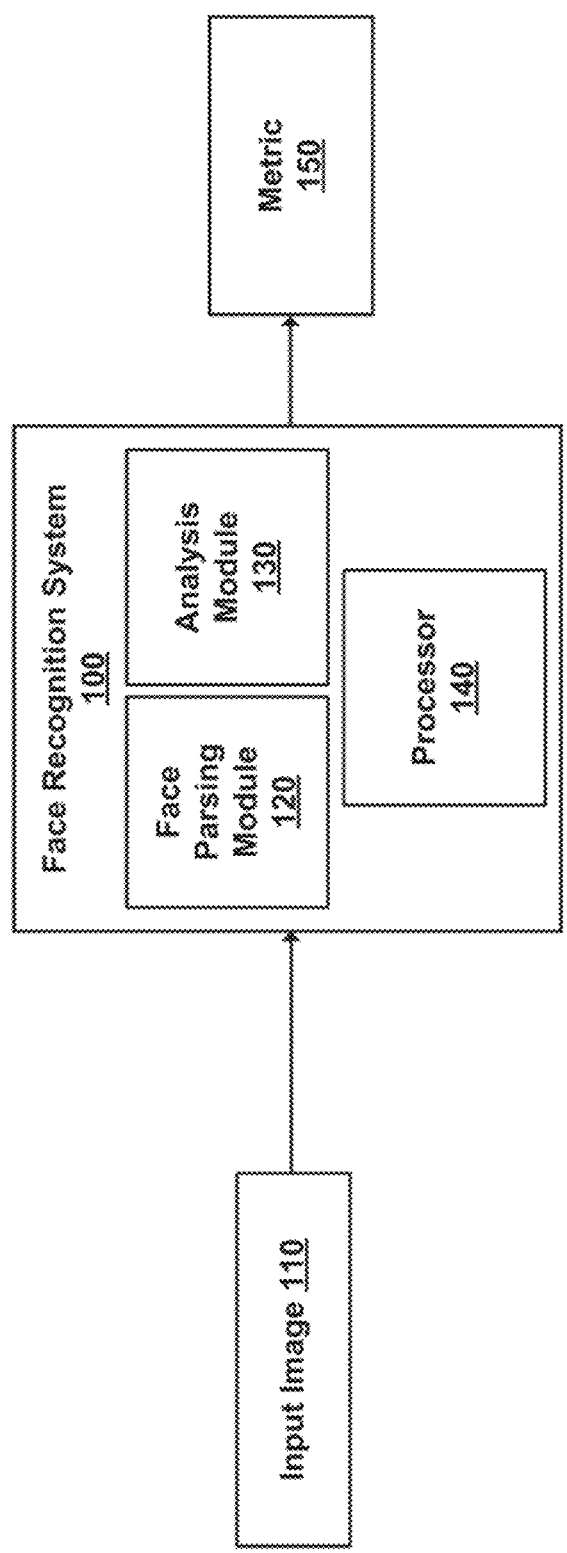
FIG. 1 is a simplified diagram of a face recognition system.

FIG. 1 is a simplified diagram of a face recognition system 100, according to one embodiment. The face recognition system 100 receives an input image 110 and tries to recognize the face (i.e., associate the face with a specific individual). The face recognition system 100 from the input image 110 identifies components (e.g., face parts) including, but not limited to, eyes, eyebrows, a nose, and a mouth. The face recognition system 100 performs analysis to generate a metric 150 based on the identified components. The metric 150 may indicate characteristics of identified components or an individual in the input image 110.

The face recognition system 100 includes a face parsing module 120, an analysis module 130, and a processor 140. Each of the modules may be embodied as hardware, software, firmware, or a combination thereof. Together, these modules perform face parsing to analyze the subject in the input image 110.

The face parsing module 120 receives the input image 110 as an input and identifies locations and/or footprints of components of the input image 110. In one approach, the face parsing module 120 involvements hierarchical interlinked multiscale convolutional neural network (HIM). The HIM obtains image patches in different resolutions (i.e., scales) from the input image 110, and integrates the image patches by using neural networks in the HIM. In addition, the face parsing module 120 generates an indication of the locations and/or footprints of the identified components.

The analysis module 130 performs analysis on the identified components from the face parsing module 120. In one aspect, the analysis module 130 determines whether a subject in the input image 110 and a subject in a reference face image (not shown) match. The analysis module 130 may obtain characteristics of the identified components, and compare the identified components with corresponding components in the reference face image. The face recognition system 100 may have a large database of reference face images for different individuals and may compare the input image 110 to many different reference face images in order to identify the individual for the input image 110. Further, the analysis module 130 generates a metric 150 on whether the input images 110 belong to the same subject (person) based on the representations of the input images 110.

The processor 140 executes instructions to perform face recognition on the face recognition system 100. The processor 140 receives instructions from memory (not shown), or external circuitry. The instructions may also reside completely or at least partially, within the processor 140 (e.g., within a processor's cache memory). According to the instructions, the processor 140 transforms or selects a portion of the input images 110 to provide to the face parsing module 120. In addition, the processor 140 operates the face parsing module 120 and the analysis module 130 according to the instructions to perform functions of the face recognition.

Face Parsing

Figure 2:
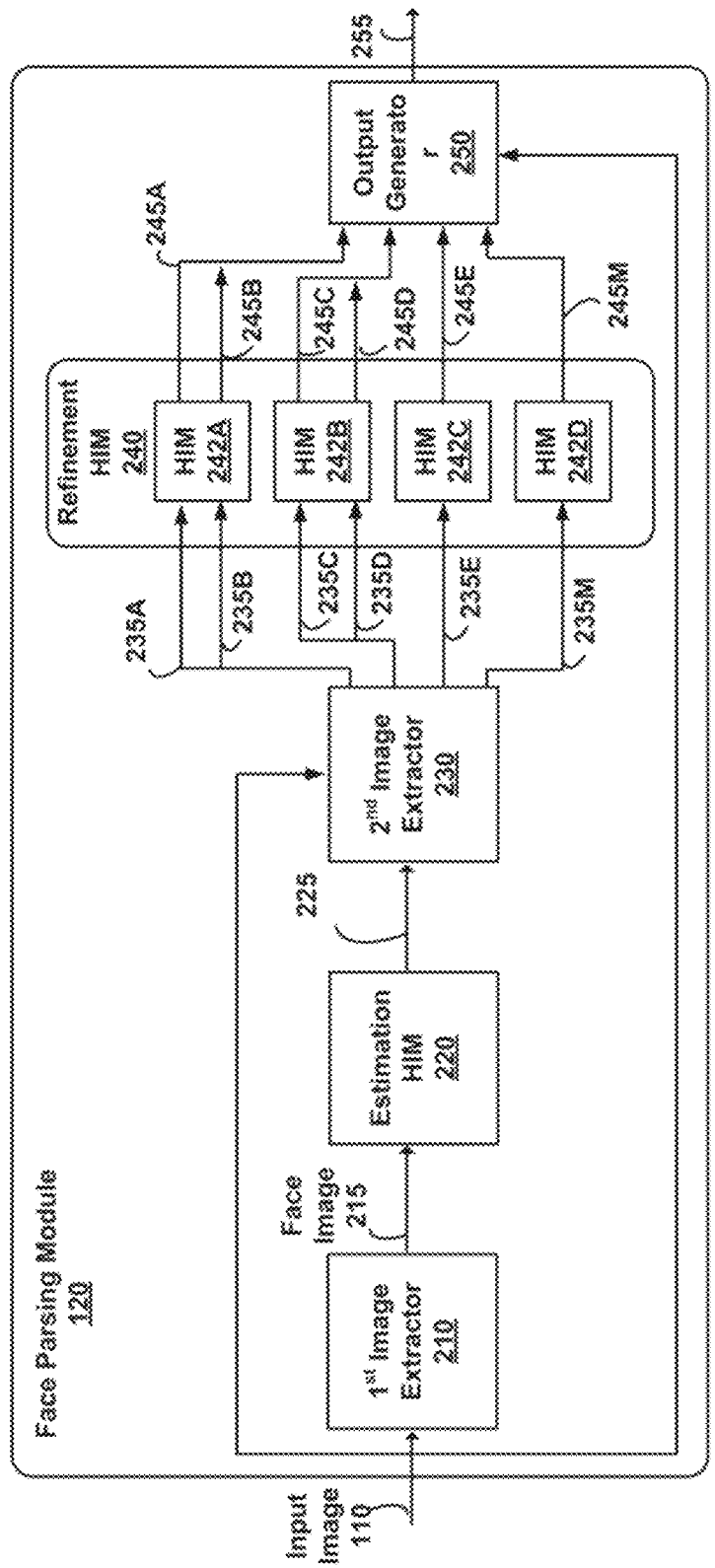
FIG. 2 is a diagram of a face parsing module.

FIG. 2 is a diagram of an example face parsing module 120. The face parsing module 120 includes one or more HIMs. The face parsing module 120 trains neural networks in each HIM to identify locations and/or footprints of components in the input image 110. Each of the HIM segregates information in different resolutions to effectively utilize local appearances and global characteristics of the components.

As illustrated in FIG. 2, the face parsing module 120 includes a first image extractor 210, estimation HIM 220, second image extractor 230, refinement HIM 240 and an output generator 250 in one implementation. In one embodiment the face parsing module 120 includes two stages of HIMs: the estimation HIM 220 and refinement HIM 240. The estimation HIM 220 obtains an estimate of locations of the components in the input image 110, and the refinement HIM 240 further refines the identified locations of the components. In other embodiments, the face parsing module 120 may include only one of the estimation HIM 220 and refinement HIM 240 or include more than two stages of HIMs in a series or parallel configuration.

The first image extractor 210 receives the input image 110, and generates the face image 215. Preferably, the first image extractor 210 extracts the face image 215 in 64×64 pixels from the input image, but may extract the face image 215 in other sizes (e.g., 80×80 pixels).

The estimation HIM 220 receives the face image 215 and identifies locations of the face parts. In one approach, the estimation HIM 220 identifies locations of the face parts including eyebrows, eyes, a nose, an upper lip an inner mouth, a lower lip, and background, and generates corresponding binary label maps 225 to indicate locations of the corresponding components. Preferably, the estimation HIM 220 receives the face image 215 in 64×64×3 pixels (where the ×3 represents three color channels). In other embodiments, the estimation HIM 220 may identify more or less number of components. For example, the estimation HIM 220 may omit the background and generate eight binary label maps instead.

The second image extractor 230 receives the locations of the face parts and generates corresponding partial face images. The second image extractor 230 receives the locations of the face parts in binary label maps 225 from the estimation HIM 220 for extracting partial face images 235A-E, and 235M. In one implementation, the second image extractor 230 generates each of the partial face images 235A-E including a left eye, a right eye, a left eyebrow, a right eyebrow, and a nose, respectively, based on its corresponding binary label map 225. Additionally, the second image extractor 230 generates the partial face image 235M including a mouth (including an upper lip, inner mouth, and a lower lip) based on binary label maps 225 for the upper lip, inner mouth and lower lip. In one approach, the second image extractor 230 generates the partial face images 235A-E in 64×64 pixels, and the partial face image 235D in 80×80 pixels. The second image extractor 230 may generate any number of partial face images 235 in any sizes based on the locations of the face parts. In one implementation, the first image extractor 210 may be used to perform the function of the second image extractor 230.

The refinement HIM 240 receives the partial face images 235A and identifies refined locations of the face parts. In one approach, the refinement HIM 240 identifies refined locations of face parts including eyebrows, eyes, a nose, an upper lip, an inner mouth, a lower lip, and background, and generates corresponding refined binary label maps 245A-E, and 245M to indicate locations of the corresponding components. Each refined binary label map 245 is used to indicate refined locations and/or footprints of the face parts. The refined locations and/or footprints of the face parts may be used by the analysis module 130 for performing analysis of the face parts.

In one implementation, the refinement HIM 240 includes four additional HIMs 242A-D as a second stage for refining the locations of the face parts. The additional HIM 242A receives the partial face image 235A including an eye (e.g., left eye) and generates the refined binary label map 245A to indicate a refined location of the eye. Because eyes are substantially symmetric, the additional HIM 242A also receives the partial face images 235B including the other eye (e.g., right eye) and generates the refined binary label map 245B to indicate a refined location of the other eye. In one approach, the additional HIM 242A flips the partial face image 235B for locating the other eye and flips the results to generate the refined binary label map 245B. The additional HIM 242B similarly identifies refined locations of the eyebrows and generates the refined binary label maps 245C and 245D for each eyebrow, based on the partial face image 235C and 235D. Additionally, the additional HIM 242C receives the partial face image 235E including the nose, and generates the refined binary label map 245E to indicate a refined location of the nose. Moreover, the additional HIM 242D receives the partial face image 235M including the mouth, and generates the refined binary label map 245M to indicate a refined location of the mouth including the upper lip, inner mouth and the lower lip. In other embodiments, the refinement HIM 240 may include any number of additional HIMs.

The output generator 250 receives the refined locations of the face parts, and generates a parsed output image 255. In one aspect, the output generator 250 overlays the locations of the face components on the input image 110. The parsed output image 255 may be used by the analysis module 130 for performing analysis of the input image 110 or provided to a user for display.

Figure 3:
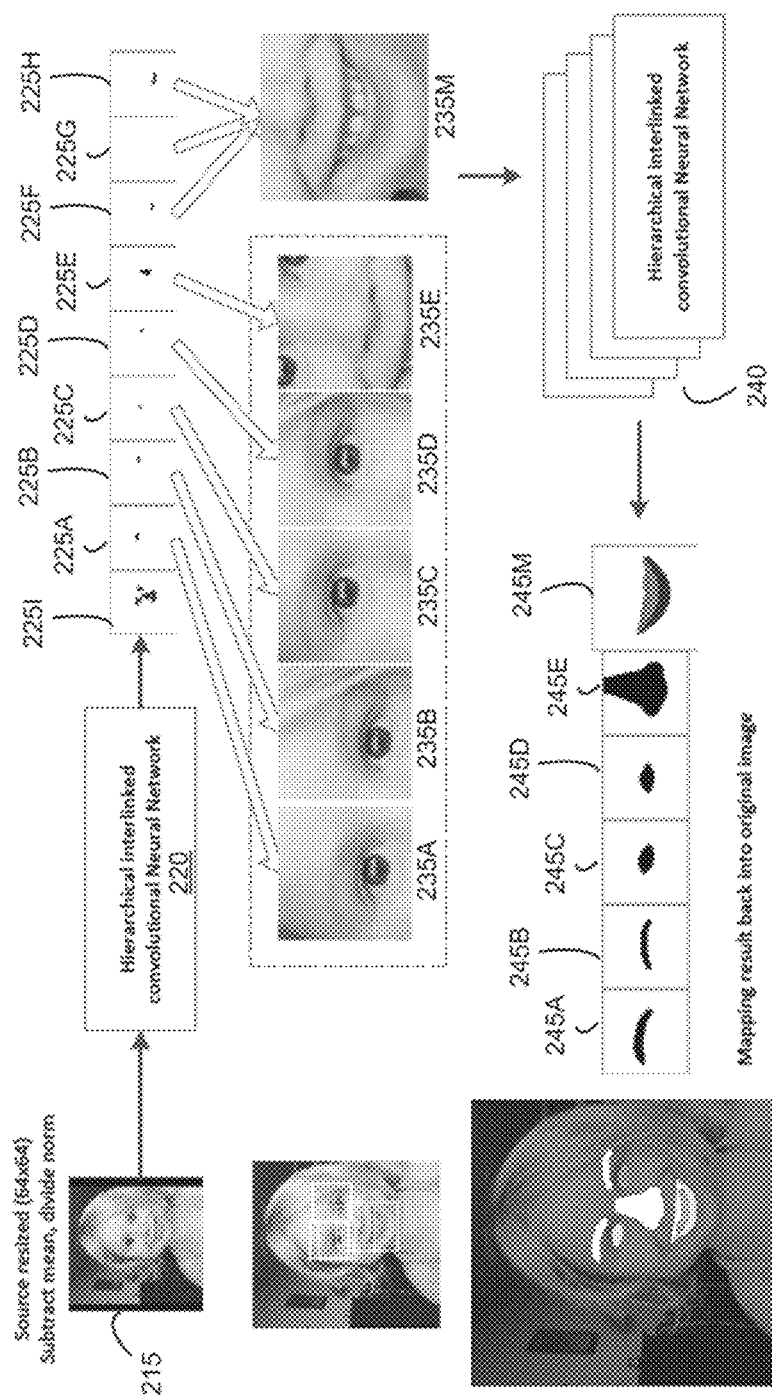
FIG. 3 is a diagram of an example process of parsing an input image by the face parsing module.

FIG. 3 is a diagram of an example process of parsing the face image 215 using the face parsing module 120. In this example, the estimation HIM 220 receives the face image 215 in 64×64 pixels and generates binary label maps 225A-I to identify locations of the face parts including a left eye, right eye, left eyebrow, right eyebrow, nose, upper lip, inner mouth, lower lip, and a background, respectively.

Based on the identified locations of the face parts, the second image extractor 230 extracts partial face images 235 for the face parts. In this example, the second image extractor 230 extracts the partial face images 235A-E in 64×64 pixels for the left eyebrow, right eyebrow, left eye, right eye, and nose, respectively. In addition, the second image extractor 230 extracts the partial face image 235M in 80×80 pixels for a mouth including the upper lip, inner mouth, and lower lip.

The refinement HIM 240 receives the partial face images 235, and generates refined binary label maps 245 to obtain refined locations and/or footprints of the left eyebrow, right eyebrow, left eye, right eye, nose, and mouth, respectively.

The refined binary label maps 245M for the mouth may include binary label maps of the upper lip, inner mouth, and lower lip.

The output generator 250 receives the refined binary label maps 245, and generates a parsed output image 255 indicating locations and/or footprints of the identified face parts of the face image 215.

Face Parsing

Figure 4:
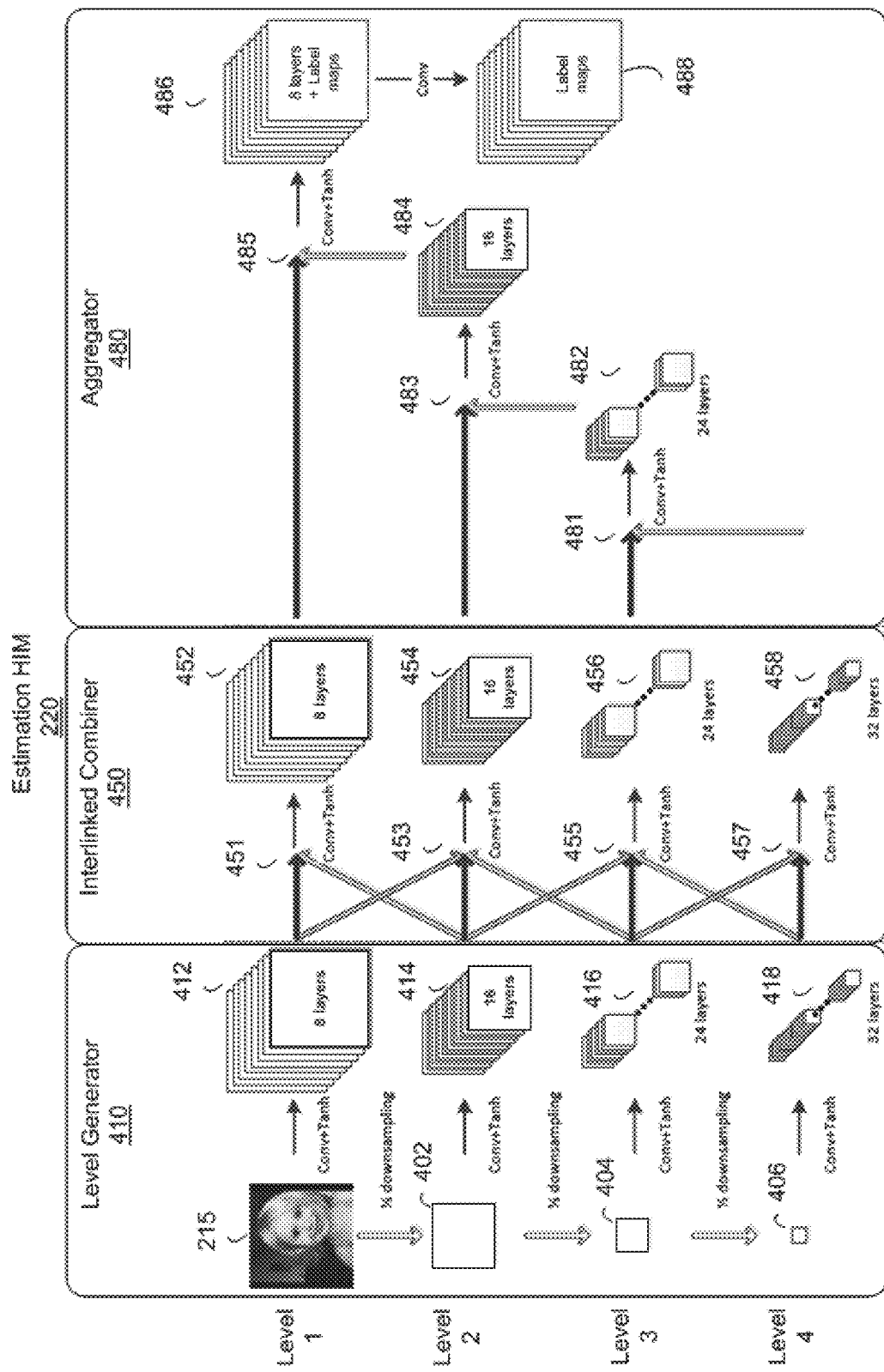
FIG. 4 is a diagram of an example architecture of a hierarchical interlinked multiscale convolutional neural network (HIM).

FIG. 4 is a diagram of example architecture of estimation HIM 220. The HIM 220 receives an image as an input and generates one or more label maps of the target area. In one embodiment, the HIM 220 includes a level generator 410, interlinked combiner 450, and aggregator 480. In one implementation, the level generator 410 generates N levels of image patches from the face image 215. The interlinked combiner 450 integrates the image patches in different levels to generate M levels of interlinked image patches. The aggregator 480 combines the interlinked image patches to generate L levels of output image patches. Preferably, M=N and L=M-1. The additional HIMs 242 in the second stage may have same or similar architecture as the HIM 220. Depending on a supervised signal, the aggregator 480 may generate different number of outputs or label maps.

The level generator 410 receives the face image 215 and generates N levels of image patches from the face image 215, where preferably N>2. Each neural network performs down-sampling, convolution, and nonlinear transformation (e.g., tanh). Different CNN levels typically have different depth and input size. In one implementation, level n-1 has a resolution R(n-1) that is the same as the resolution of the face image 215, and every other level n has a resolution R(n) that is down-sampled by a constant factor of 2 or less relative to the preceding level n-1 with resolution R(n-1). The level generator 410 generates more image patches for levels n with lower resolutions R(n). The image patches for different levels n have different resolutions R(n) and the image patches for a level n are generated by performing convolution and nonlinear transformation on the image resampled to resolution R(n).

In the example in FIG. 4, N=4 and the different CNN levels are labeled "Level 1" to "Level 4." In this example, the face image 215 in 64×64 or 80×80 pixels is down-sampled to images 402, 404, and 406 having ½, ¼ and ⅛ size, respectively. In addition, different convolution filters and tanhactivation function are applied at each level. The input of the convolution of level 1 may be in RGB. The level generator 410 generates 8 image patches 412 in original scale for level 1, 16 image patches 414 in ½ scale for level 2, 24 image patches 416 in ¼ scale for level 3, and 32 image patches 418 in ⅛ scale for level 4.

The interlinked combiner 450 receives N levels of image patches from the level generator 410 and generates M levels of interlinked image patches from the N levels of image patches, where preferably 2<M≤N. The interlinked image patches for different levels m have different resolutions R(m) and the interlinked image patches for a level m are generated from an input group m of image patches comprising (i) image patches from level n with R(n)=R(m), and (ii) image patches from one or more levels n with R(n)≠R(m), where such image patches have been resampled to resolution R(m). Preferably, interlinked image patches for a level m from an input group m of image patches include (i) image patches from level n with R(n)=R(m), (ii) image patches, if any, from the level n with the next higher resolution than R(m), and the level n with the next lower resolution than R(m). The interlinked combiner 450 generates the interlinked image patches for a level m by performing convolution and nonlinear transformation on the input group m of image patches.

In one implementation where N=M, the interlinked combiner 450 generates the interlinked image patches for a level m to have the same number of image patches for a level n with R(n)=R(m). In this embodiment, multiple interlinked combiners 450 may be used in cascade, or the interlinked combiner 450 may be used recursively multiple times.

In the example in FIG. 4, N=M=4 and the interlinked combiner 450 generates 4 levels of interlinked image patches 452, 454, 456, and 458 based on the image patches 412, 414, 416, and 418. For level m with R(n)=R(m), the interlinked combiner 450 generates same number of image patches from level n by integrating the image patches from the level n and adjacent levels of the level n as an input group m of image patches and performing convolution and nonlinear transformation on the input group m of image patches. For integrating image patches having different resolutions, the interlinked combiner 450 resamples the image patches from a level R(n)≠R(m) to resolution R(m).

For example, to generate the interlinked image patches 452 for level 1, the interlinked combiner 450 combines(or stacks) 8 image patches 412 from level 1 and 16 image patches 414 from level 2 as an input group 1 of image patches 451 to have 24 image patches. To match the resolution, the interlinked combiner 450 up-samples the 16 image patches 414 from level 2 to resolution R(m=1). Additionally, the interlinked combiner 450 performs convolution and nonlinear transformation on the input group 1 of image patches 451 to generate 8 interlinked image patches 452 for level 1.

Similarly, to generate the interlinked image patches 454 for level 2, the interlinked combiner 450 combines (or stacks) 8 image patches 412 from level 1, 16 image patches 414 from level 2, and 24 image patches from level 3 as an input group 2 of image patches 453 to have 48 image patches. To match the resolution the interlinked combiner 450 up-samples 24 image patches 416 from level 3 and down-samples 8 image patches 412 from level 1 to resolution R(m=2). Additionally, the interlinked combiner 450 performs convolution and nonlinear transformation on the input group 2 of image patches 453 to generate 16 interlinked image patches 454 for level 2.

To generate the interlinked image patches 456 for level 3, the interlinked combiner 450 combines (or stacks) 16 image patches 414 from level 2, 24 image patches from level 3, and 32 image patches 418 from level 4 as an input group 3 of image patches 455 to have 72 image patches. To match the resolution, the interlinked combiner 450 up-samples 32 image patches 418 from level 4, and down-samples 16 image patches 414 from level 2 to resolution R(m=3). Additionally, the interlinked combiner 450 performs convolution and nonlinear transformation on the input group 3 of image patches 455 to generate 24 interlinked image patches 456 for level 3.

To generate the interlinked image patches 458 for level 4, the interlinked combiner 450 combines (or stacks) 24 image patches 416 from level 3, and 32 image patches 418 from level 4 as an input group 4 of image patches 457 to have 56 image patches. To match the resolution, the interlinked combiner 450 down-samples 24 image patches 416 from level 3 to resolution R(m=4). Additionally the interlinked combiner 450 performs convolution and nonlinear transformation on the input group 4 of image patches 457 to generate 32 interlinked image patches 458 for level 4.

The aggregator 480 receives the M levels of interlinked image patches from the interlinked combiner 450 and generates L levels of output image patches, where L<M. The output image patches for different levels have different resolutions R(l). Each R(l) corresponds to one of the R(m), and the output image patches 486 for a level 1 are generated by performing convolution and nonlinear transformation on an input group l of image patches that includes (i) interlinked image patches from level m with R(m)=R(l), and (ii) output image patches from the level m with next lower resolution than R(l) where such output image patches have been resampled to resolution R(l). In addition, the aggregator 480 generates one or more label maps 488 to locate the components based on the output image patches 486 of highest resolution.

In the example FIG. 4, N=M=4 m L=3 and the aggregator 480 sequentially combines (or stacks) interlinked image patches from different levels. First, the aggregator 480 up-samples 32 interlinked image patches 458 from level 4, and combines(or stacks) them with 24 interlinked image patches 456 from level 3 to form an input group 3 of 56 image patches 481. The aggregator 480 performs convolution and nonlinear transformation on the input group 3 of the image patches 481 to generate 24 output image patches 482 for the level 3.

In addition, the aggregator 480 up-samples the 24 output image patches 482 from the level 3 and combines (or stacks) them with 16 interlinked image patches 454 from level 2 to form an input group 2 of 40 image patches 483. The aggregator 480 performs convolution and nonlinear transformation on the input group 2 of the image patches 483 to generate 16 output image patches 484 for the level 2.

Similarly, the aggregator 480 up-samples the 16 output image patches 484 from the level 2 and combines (or stacks) them with 8 interlinked image patches 452 from level 1 to form an input group 1 of 24 image patches 485. The aggregator 480 performs convolution and nonlinear transformation on the input group 1 of the image patches 485 to generate output image patches 486 for the level 1. In one aspect, the output image patches 486 include 8 output image patches and additional output image patches, preferably twice the number of label maps (e.g., 2*label maps+8). The aggregator 480 also performs additional convolution on the output image patches 486 from the level 1 to generate binary label maps 488.

One aspect of the HIM 220 involves performing convolution and nonlinear transformation. Performing convolution and nonlinear transformation allows deep neural network to fit nonlinear functions from block of inputs with a deep structure. Denote 2d-input data with $L_1$ channels with $In_{x,y}^k$, the convolution filter $W_{k,i,j,y}^L$, 2d-output $Out_{x,y}^L$, bias for each output layer $B^L$, the convolution and nonlinear transformation performed by the HIM 220 can be characterized as followed:

$$Out_{x,y}^L = \tanh\left(\sum_{i=0}^{R_w}\sum_{j=0}^{R_w}\sum_{k=0}^{L_l} In_{x+i-pad,y+j-pad}^k * W_{k,i,j}^L + B^L\right) \quad (1)$$

For linear convolution used to obtain the binary label maps 488, the tanh operator may be omitted. In one implementation, identical sizes of input and output is preferred, so the outside of the visible range of the input is padded with a ring of zeroes ($In_{x,y}^k$=0, for x and y outside the visible range). The padding shift pad may be set to be $(R_W-1)/2$, so that output's receptive field is centered at the same position of input Bias parameters $B^L$ may be applied after convolution before tanh.

Another aspect of the HIM 220 involves performing down-sampling to enable neuron to have bigger receptive field. In one approach, a max pooling technique is used for down-sampling. Given an N×N input $In_{x,y}^L$, max-pooling takes max value from each M×M subpatch as its output. A stride K can be set so that subpatch can have an overlapping spatial locality.

$$Out_{x,y}^L = \max_{i,j=0}^{M} In_{x*K+i, y*K+j}^L \qquad (2)$$

Yet, another aspect of the HIM 220 involves performing up-sampling. In one approach, the up-sampling is performed by adding redundancy. Up-sampling pads response map in a rougher scale to make it fit in to a finer scale. For example, 2×2 up-sampling may be defined as followed:

$$Out_{2x+1,2y+1}^L = Out_{2x+1,2y+2}^L = Out_{2x+2,2y+1}^L = Out_{2x+2,2y+2}^L = In_{x,y}^L \qquad (3A)$$

$$Out_{x,y}^L = In_{\lfloor x/2 \rfloor, \lfloor y/2 \rfloor}^L \qquad (3B)$$

Further, another aspect of the HIM 220 involves generating pixel-wise label maps directly. In maps as followed:

$$Softmax_{x,y}^L = e^{In_{x,y}^L} / \sum_{i=1}^{L_{in}} e^{In_{x,y}^i} \qquad (4)$$

$$Loss = \sum_{i,j=1}^{i<=W, j<=H} \sum_{k=1}^{Lout} \log(Softmax_{i,j}^k * L_{i,j}^k) \qquad (5)$$

where $L_{x,y}^L$ is the supervise signal, which is a labeling that only correct category for L in 1 ... Lout has value 1, others with value 0. Here, W and H represent the width and height of output label respectively. Preferably, the aggregator 480 will apply a sofaxmax, and calculate loss function using log likelihood.

Operation of Face Parsing

Figure 5:
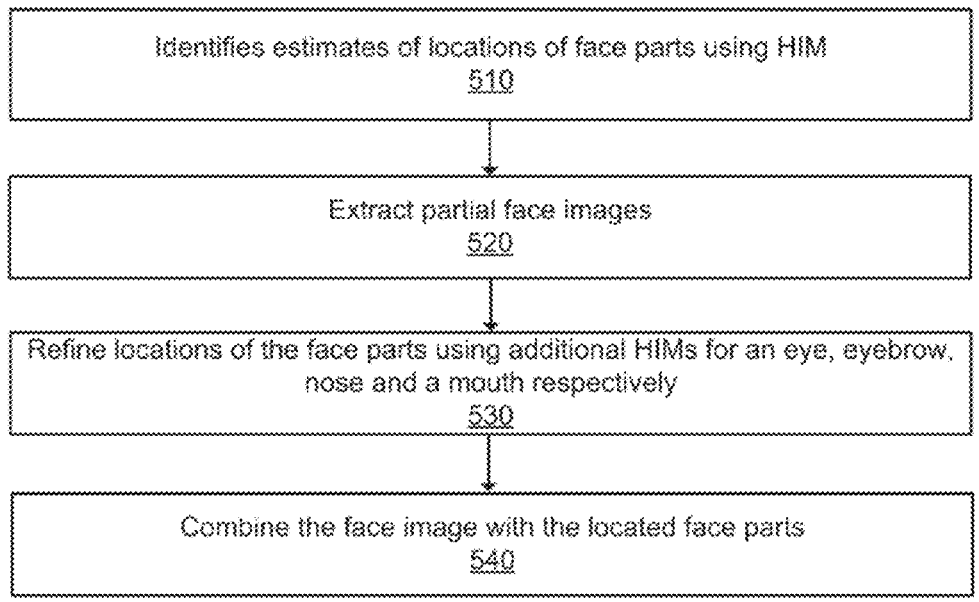
FIG. 5 is a flow diagram of a method of parsing a face image.

FIG. 5 is a flow diagram of a method of parsing a face image, according to one embodiment. The face parsing module 120 employs one or more HIMs for generating representations of face images. The face parsing module 120 identifies 510 estimates of locations of face parts using HIM. The face parsing module 120 extracts 520 partial face images based on the estimated locations of the partial face images using the image extractor 230. The face parsing module 120 refines 530 locations of the face parts using additional HIMs as a second stage for eyes, eyebrows, a nose and a mouth based on the extracted partial face images. The face parsing module 120 combines 540 the face images with located face parts to indicate locations and/or footprints of the face parts.

Figure 6:
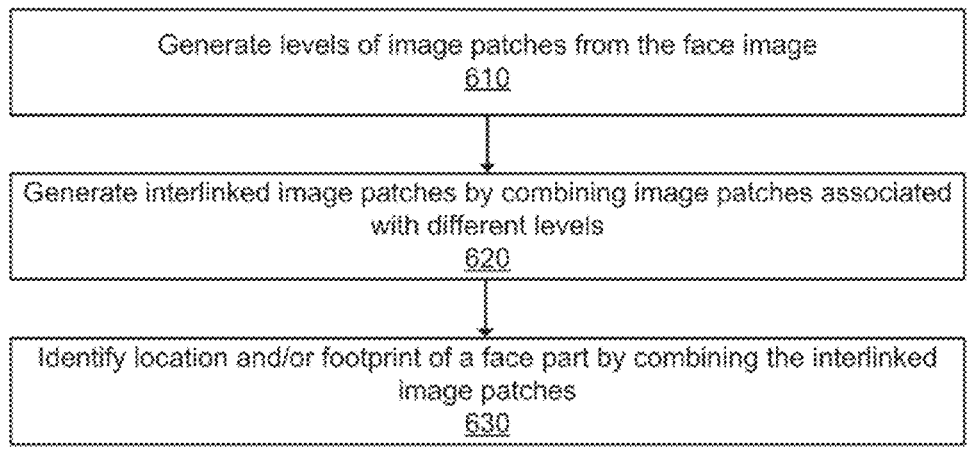
FIG. 6 is a flow diagram of a method of identifying locations or footprints of face parts.

FIG. 6 is a flow diagram of a method of identifying locations and/or footprints of face parts. HIM generates 610 levels of image patches from the face image. The HIM generates 620 interlinked image patches by combining image patches associated with different levels. The interlinked image patches for different levels m have different resolutions R(m) and the interlinked image patches for a level m are generated from an input group m of image patches comprising (i) image patches from level n with R(n)=R(m), and (ii) image patches from one or more levels n with R(n)≠R(m), where such image patches have been resampled to resolution R(m). Preferably, interlinked image patches for a level m from an input group m of image patches that includes (i) image patches from level n with R(n)=R(m), (ii) image patches, if any, from the level n with the next higher resolution than R(m), and the level n with the next lower resolution than R(m). The HIM identifies 630 a location and/or footprint of a face part by combining the interlinked image patches and generating one or more binary label maps.

Simulation Results

In order to verify the performance of the face recognition system 100 and the face parsing module 120, different image parsing approaches including max-pooling fully-connected (MPFC), a pure convolutional tanh (TANH), a hierarchical CNN without interlinked multiscale (HNOIM), and the face parsing module 120 including the BIM 220 are tested.

For comparison, 2330 face images from Helen database are applied. The 2330 face images are separated into 3 groups, 2000 images for training, 230 for validation/tuning, and 100 for testing. Because annotation in Helen database is landmark-based, images in the Helen database are resized and modified to be roughly aligned on pixel-level ground truth data for better comparison. For the comparison, ground truth eye, eyebrow, nose, inside mouth, upper lip and lower lip segments are automatically generated by using the manually-annotated contours as segment boundaries.

Figure 7:
FIG. 7 illustrates original images and processed images with identified face parts for comparison, according to one embodiment.

FIG. 7 illustrates examples of original images and ground truth processed images with identified face parts for comparison Original images 710 from the Helen database are showing a top row, and ground truth images 720 with identified face parts are shown in a bottom row. The images in the top row have dot markers around each component contour. These dots are in a predefined order that mark eye, eyebrow, etc. The ground truth images in the bottom row are processed to link these dots softly to generate pixel-wise label areas.

For every image in training set and tuning set, a patch image of each component is extracted. Preferably, patches images are sized in 64×64 pixels to include one of eyebrow, eye, and nose in dataset, and 80×80 pixels to include a mouth.

To prevent overfitting and enhance the face parsing module 120, data argumentation is applied. A random ±15-degree rotation, random 0.9-1.1× scaling, and random ±10 pixel shifting in every direction is applied each time when a patch image is selected as an input.

Figure 8:
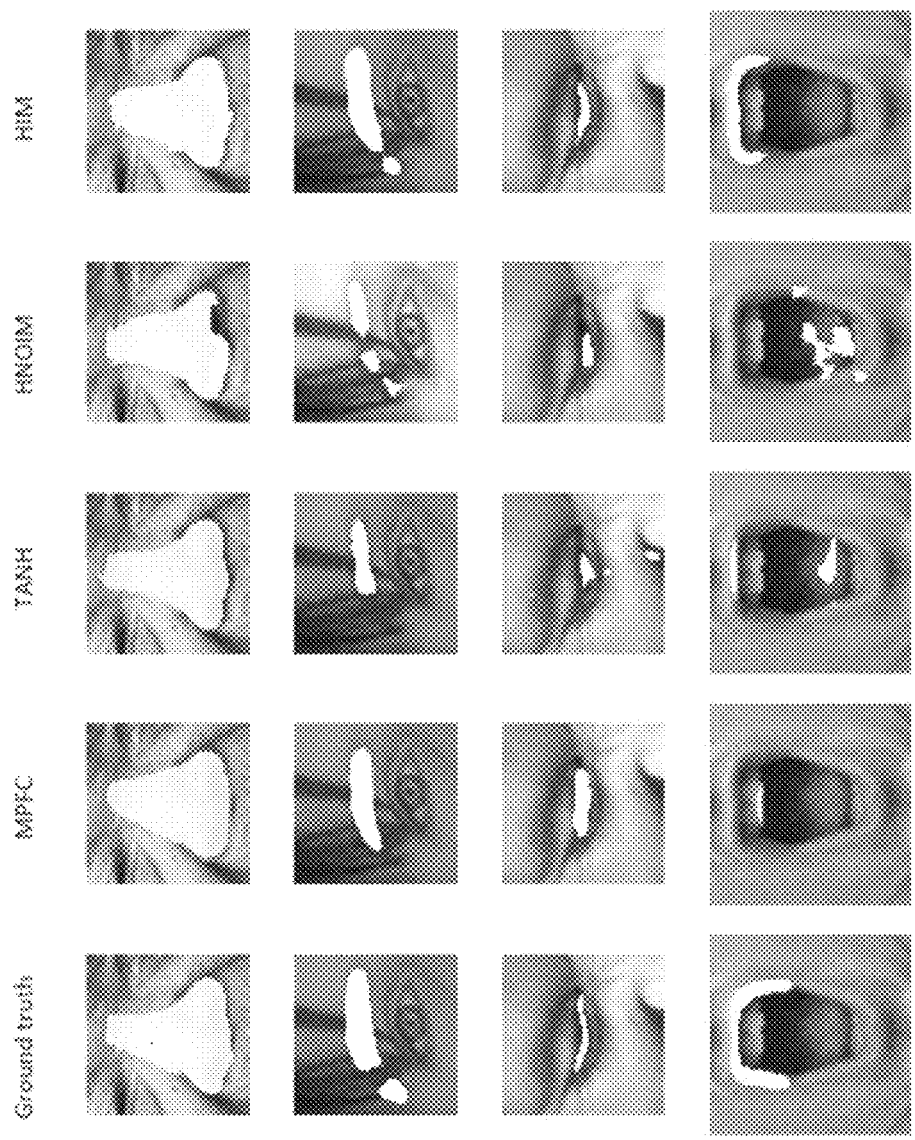
FIG. 8 illustrates images with identified face parts obtained by various methods.

FIG. 8 illustrates image patches including one of identified face parts obtained by various methods for comparisons. The first column includes image patches of ground truth including a nose, eyebrow, eye, and an upper lip. The second column includes image patches with components identified using MPFC. The third column includes image patches with components identified using TANH. The fourth column includes image patches with components identified using HNOIM. The fifth column includes image patches with components identified using HIM, as described above, MPFC, TANH and HNOIM are alternate approaches.

As illustrated in FIG. 8, despite MPFC captures global characteristic well, MPFC performs poorly at shading, non-rigid transformation and unseen large deformations. In contrast, TANH and HNOIM focus more on local appearances, but lack in integration of global characteristic. TANH and HNOIM have random noise at random places in the response, unlike the MPFC model. As a result, TANH and HNOIM yield poor identification of components. HIM (the approach described above) utilizes good balance between global characteristic and local appearance, thereby achieving excellent results close to ground truth in the first column.

In Table 1, F1-score of MPFC, TANH, HNOIM and HIM on image patches are listed. As indicated in Table 1, HIM outperforms MPFC, TANH and HNOIM in identifying an eyebrow, eye, nose, and upper lip. HNOIM performs slightly better than HIM in identifying an inner mouth and lower lip. Nevertheless, HIM still performs well for the inner mouth and lower lip.

TABLE 1

The F1-score comparison of each model on each component

| Model | Eyebrow | Eye | Nose | Upper lip | In mouth | Lower lip |
|---|---|---|---|---|---|---|
| MPFC | 0.812 | 0.875 | 0.930 | 0.662 | 0.786 | 0.798 |
| TANH | 0.723 | 0.794 | 0.920 | 0.636 | 0.681 | 0.726 |
| HNOIM | 0.717 | 0.854 | 0.919 | 0.729 | 0.842 | 0.842 |
| HIM | 0.877 | 0.894 | 0.961 | 0.778 | 0.836 | 0.833 |

Figure 9:
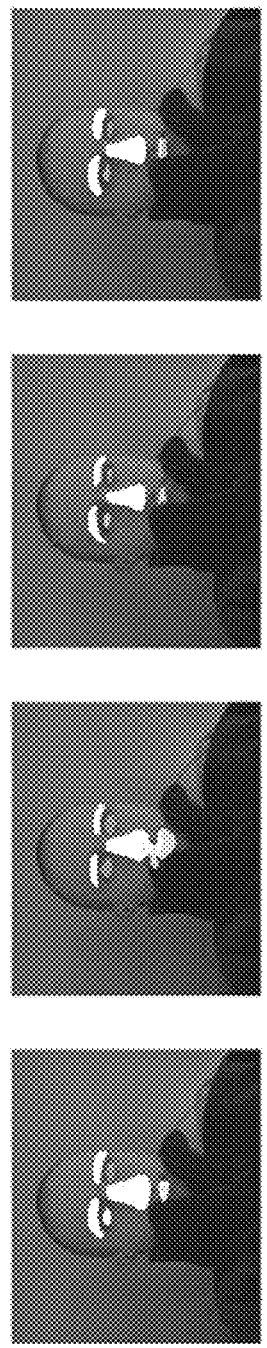
FIG. 9 illustrates face images with identified face parts obtained by various methods with conventional landmarking.

FIG. 9 illustrates face images with identified face parts obtained by various methods with a conventional landmarking. The conventional landmarking is used in place of the estimation HIM 220 to locate face parts for comparing the performance of MPFC, TANH, HNOIM, and HIM. Image 910 is a result obtained by MPFC, image 920 is a result obtained by TANH, image 930 is a result obtained by HNOIM, and image 940 is a result obtained by HIM.

In Table 2, F1-score of MPFC, TANH, HNOIM and HIM with the conventional landmarking on the face images are listed. HIM produces impressing result as shown in FIG. 9.

TABLE 2

The F1-score comparison of each model on each component with a conventional landmarking.

| Model | Eyebrow | Eye | Nose | Upper lip | In mouth | Lower lip | Overall |
|---|---|---|---|---|---|---|---|
| MPFC | 0.73 | 0.84 | 0.80 | 0.67 | 0.75 | 0.74 | 0.772 |
| TANH | 0.76 | 0.69 | 0.88 | 0.57 | 0.55 | 0.64 | 0.741 |
| HNOIM | 0.70 | 0.81 | 0.80 | 0.49 | 0.58 | 0.57 | 0.708 |
| HIM | 0.82 | 0.88 | 0.92 | 0.75 | 0.83 | 0.80 | 0.858 |

Figure 10:
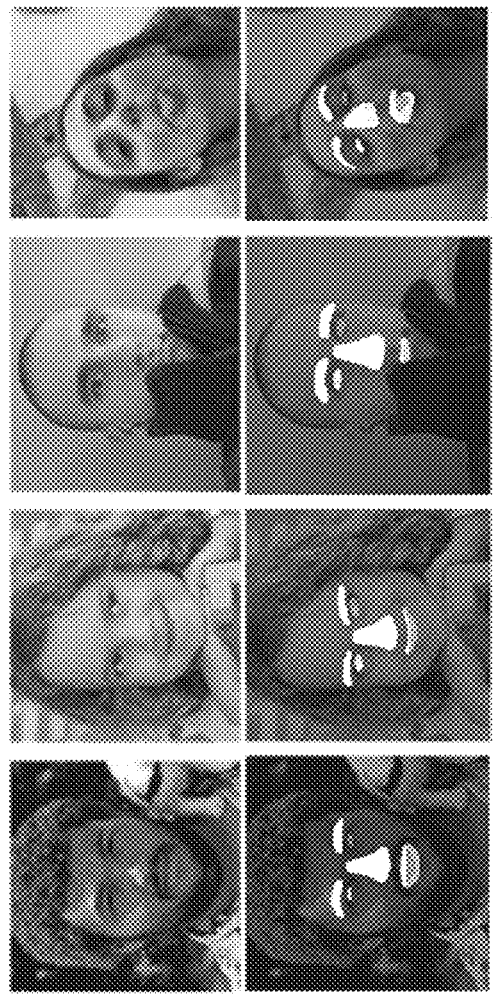
FIG. 10 illustrates face images with identified face parts obtained by the face parsing module.

FIG. 10 illustrates face images with identified face parts obtained by the face parsing module 120. Original images 1010 from the Helen database are shown in a top row, and images 1020 with identified face parts are shown in a bottom row.

As illustrated in FIG. 10, the face parsing module 120 with HIMs perform well at capturing the complex shape of eyebrows, the nose ridge and the highly deformable lips. The face parsing module 120 do not need any preprocessing, and the head location and rough segmentation is automatically obtained in the estimating HIM 220.

Although the detailed description contains many specifics, these should not be construed as limiting the scope of the invention but merely as illustrating different examples and aspects of the invention. It should be appreciated that the scope of the invention includes other embodiments not discussed in detail above. For example, the principles disclosed in the HIM 220 or the face parsing module 120 can also be applied to other areas or objects besides face recognition and representation, for example parsing other types of images. Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

In alternate embodiments, the invention is implemented in computer hardware, firmware, software, and/or combinations thereof. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits) and other forms of hardware.

What is claimed is:

1. A system for parsing an image into components, the system comprising:
 a hierarchical interlinked multiscale convolutional neural network (HIM) for locating the components from the image, the HIM comprising:
  a level generator configured to receive the image and to generate N levels of image patches from the image, N>2, wherein the image patches for different levels n have different resolutions R(n) and the image patches for a level n are generated from the image resampled to resolution R(n);
  an interlinked combiner configured to receive the N levels of image patches from the level generator and to generate M levels of interlinked image patches from the N levels of image patches, 2<M≤N, wherein the interlinked image patches for different levels m have different resolutions R(m) and the interlinked image patches for a level m are generated from an input group m of image patches comprising (i) image patches from level n with R(n)=R(m), and (ii) image patches from one or more levels n with R(n)≠R(m) where such image patches have been resampled to resolution R(m); and an aggregator configured to locate the components by combining the M levels of interlinked image patches.

2. The system of claim 1, wherein the level generator generates the image patches for a level n by performing convolution and nonlinear transformation on the image resampled to resolution R(n).

3. The system of claim 1, wherein interlinked combiner generates the interlinked image patches for a level m by performing convolution and nonlinear transformation on the input group m of image patches.

4. The system of claim 1, wherein the aggregator is configured to receive the M levels of interlinked image patches and to generate L levels of output image patches, L<M, wherein the output image patches for different levels l have different resolutions R(l), each R(l) corresponding to one of the R(m), and the output image patches for a level l are generated from an input group l of image patches comprising (i) interlinked image patches from level m with R(m)=R(l), and (ii) output image patches from one or more levels with resolution less than R(l) where such output image patches have been resampled to resolution R(l).

5. The system of claim 4, wherein the aggregator generates the output image patches for a level l by performing convolution and nonlinear transformation on the input group l of image patches.

6. The system of claim 4, wherein the aggregator locates the components based on the output image patches of highest resolution.

7. The system of claim 1, wherein M=N.

8. The system of claim 7, wherein level n=1 has a resolution R(n=1) that is the same as the resolution of the image, and every other level n has a resolution R(n) that is down-sampled by a constant factor relative to the preceding level n−1 with resolution R(n−1).

9. The system of claim 8, wherein the constant factor is a down-sampling of 2 or less.

10. The system of claim 8, wherein the level generator generates more image patches for levels n with lower resolutions R(n).

11. The system of claim 7, wherein the interlinked combiner generates interlinked image patches for a level m from an input group m of image patches consisting of (i) image patches from level n with R(n)=R(m), (ii) image patches, if any, from the level n with the next higher resolution than R(m), and the level n with the next lower resolution than R(m), where such image patches have been resampled to resolution R(m).

12. The system of claim 7, wherein the aggregator generates output image patches for a level l from an input group l of image patches consisting of (i) interlinked image patches from level m with R(m)=R(l), and (ii) output image patches from the level m with next lower resolution than R(l) where such output image patches have been resampled to resolution R(l).

13. The system of claim 1, further comprising:
a second stage of hierarchical interlinked multiscale convolutional neural networks configured to receive the component locations produced by the HIM, each hierarchical interlinked multiscale convolutional neural network in the second stage configured to further refine at least one of the location and footprint of one of said components.

14. The system of claim 1, wherein the image is a face image and the components are face components including an eye, an eyebrow, a nose and a mouth.

15. The system of claim 14, wherein the aggregator produces binary label maps indicating locations of the face components.

16. The system of claim 14, further comprising:
a second stage of hierarchical interlinked multiscale convolutional neural networks configured to receive the face component locations produced by the HIM, at least one of the hierarchical interlinked multiscale convolutional neural networks in the second stage configured to further refine at least one of the location and footprint of the eye, of the nose and of the mouth, respectively.

17. The system of claim 16, further comprising:
an image extractor coupled between the HIM and the second stage, the image extractor for extracting face component images based on the face image and the locations of the face components produced by the HIM, the extracted face component images provided to the second stage.

18. The system of claim 14, further comprising:
an output generator configured to overlay the locations of the face components on the face image.

19. The system of claim 1, wherein:
M=N and L=M−1;
level n=1 has a resolution R(n=1) that is the same as the resolution of the image, and every other level n has a resolution R(n) that is down-sampled by a constant factor of 2 or less relative to the preceding level n−1 with resolution R(n−1);
the level generator generates the image patches for a level n by performing convolution and nonlinear transformation on the image resampled to resolution R(n), and the level generator generates more image patches for levels n with lower resolutions R(n);
the interlinked combiner generates the interlinked image patches for a level m by performing convolution and nonlinear transformation on the input group m of image patches consisting of (i) image patches from level n with R(n)=R(m), (ii) image patches, if any, from the level n with the next higher resolution than R(m), and the level n with the next lower resolution than R(m), where such image patches have been resampled to resolution R(m);
the aggregator is configured to receive the M levels of interlinked image patches and to generate L levels of output image patches, L<M, wherein the output image patches for different levels l have different resolutions R(l), each R(l) corresponding to one of the R(m), and the output image patches for a level l are generated by performing convolution and nonlinear transformation on an input group l of image patches consisting of (i) interlinked image patches from level m with R(m)=R(l), and (ii) output image patches from the level m with next lower resolution than R(l) where such output image patches have been resampled to resolution R(l); and
the aggregator locates the components based on the output image patches of highest resolution.

20. A method for parsing an image into components, the method comprising:
generating N levels of image patches from the image, N>2, wherein the image patches or different levels n have different resolutions R(n) and the image patches for a level n are generated from the image resampled to resolution R(n);
generating M levels of interlinked image patches from the N levels of image patches, 2<M≤N, wherein the interlinked image patches for different levels m have different resolutions R(m) and the interlinked image patches for a level m are generated from an input group m of image patches comprising (i) image patches from level n with R(n)=R(m), and (ii) image patches from one or more levels n with R(n)≠R(m) where such image patches have been resampled to resolution R(m); and locating the components by combining the M levels of interlinked image patches.

21. A non-transitory computer readable medium configured to store program code, the program code comprised of instructions for parsing an image into components, the instructions when executed by a processor cause the processor to:

generate N levels of image patches from the image, N>2, wherein the image patches or different levels n have different resolutions R(n) and the image patches for a level n are generated from the image resampled to resolution R(n);

generate M levels of interlinked image patches from the N levels of image patches, 2<M≤N, wherein the interlinked image patches for different levels m have different resolutions R(m) and the interlinked image patches for a level m are generated from an input group m of image patches comprising (i) image patches from level n with R(n)=R(m), and (ii) image patches from one or more levels n with R(n)≠R(m) where such image patches have been resampled to resolution R(m); and locate the components by combining the M levels of interlinked image patches.

* * * * *